US012059822B2

(12) United States Patent
Bourget

(10) Patent No.: US 12,059,822 B2
(45) Date of Patent: Aug. 13, 2024

(54) DUST COLLECTING CONCRETE SAW

(71) Applicant: Kyle Bourget, Augusta, KS (US)

(72) Inventor: Kyle Bourget, Augusta, KS (US)

( * ) Notice: Subject to any disclaimer, the term of this patent is extended or adjusted under 35 U.S.C. 154(b) by 843 days.

(21) Appl. No.: 17/183,585

(22) Filed: Feb. 24, 2021

(65) Prior Publication Data

US 2021/0178633 A1 Jun. 17, 2021

(51) Int. Cl.
*B28D 7/02* (2006.01)
*B28D 1/04* (2006.01)

(52) U.S. Cl.
CPC ............... *B28D 7/02* (2013.01); *B28D 1/045* (2013.01)

(58) Field of Classification Search
CPC .. B28D 1/04; B28D 1/045; B28D 7/02; B24B 55/06; B24B 55/10; B24B 55/102; B27B 5/10
USPC ................................................ 125/13.01, 14
See application file for complete search history.

(56) References Cited

U.S. PATENT DOCUMENTS 5,564,408 A * 10/1996 Bassols ............... E01C 23/0933 451/344
5,857,453 A * 1/1999 Caven .................... B28D 1/045 299/39.1
6,318,351 B1 * 11/2001 Baratta ................ B23D 59/006 15/322
6,637,423 B1 * 10/2003 Rettenweber .......... B28D 1/045 125/14
2008/0060631 A1 * 3/2008 Dofher ..................... B28D 7/02 83/100
2009/0236900 A1 * 9/2009 Due ......................... B28D 7/02 125/13.01
2011/0209692 A1 * 9/2011 Gobright, IV ......... B28D 1/045 125/13.01
2012/0174905 A1 * 7/2012 Lee ........................ B23D 47/02 125/12
2014/0224237 A1 * 8/2014 Ronzello, Sr. ........... B28D 7/02 125/13.01
2016/0332330 A1 * 11/2016 Carlsson ................ B28D 7/005
(Continued)

FOREIGN PATENT DOCUMENTS

KR 20150033512 A * 4/2015 ............. B28D 1/044

OTHER PUBLICATIONS

KR-20150033512—A machine translation (Year: 2015).*

*Primary Examiner* — Brian D Keller
*Assistant Examiner* — Marcel T Dion
(74) *Attorney, Agent, or Firm* — Kenneth H. Jack; Davis & Jack L.L.C.

(57) ABSTRACT

A concrete saw for cutting a relief slot in a concrete slab surface, the concrete saw incorporating front and rear hand truck components having lower bases and upwardly extending handles, each handle being fixedly attached to one of the hand truck bases; front and rear pluralities of wheels respectively fixedly attached to and extending downwardly from the front and rear hand trucks' bases; a motor and cutting wheel combination supported upon the front hand truck's base; a motor powered vacuum supported upon the rear hand truck; a vacuum housing enshrouding an upper end of the cutting wheel; a vacuum tube operatively interconnecting the motor powered vacuum and the vacuum housing; and a releasable latch interconnecting the front and rear hand trucks so that forward propulsion of the front hand truck forwardly pulls the rearward hand truck.

15 Claims, 6 Drawing Sheets

(56) References Cited

U.S. PATENT DOCUMENTS

| | | | | |
|---|---|---|---|---|
| 2018/0009132 | A1* | 1/2018 | Merck .................... | B28D 1/045 |
| 2022/0241918 | A1* | 8/2022 | Karlsson ................ | B01D 46/48 |

* cited by examiner

DUST COLLECTING CONCRETE SAW

FIELD OF THE INVENTION

This invention relates to motor powered walk behind concrete cutting saws. More particularly, this invention relates to such saws which are adapted for vacuum collection of concrete saw dust and cuttings at the cutting site, and for carriage of the dust and cuttings to a dust container.

BACKGROUND OF THE INVENTION

Commonly known and commonly configured walk behind concrete saws include a rigid rectangular base or chassis frame having an upwardly and rearwardly extending handle. Such handle and base frame combination functions similarly with or constitutes a hand truck mechanism which carries motor and saw cutting apparatus which are fixedly mounted upon the base frame. Such concrete saw hand truck component conventionally presents a plurality of wheels which are fixedly attached to and extend downwardly from the base frame. Concrete slab cutting operation of such concrete saws commonly generates large quantities of fine crystalline silica dust particles which become airborne, often undesirably constituting respirable particles. Such airborne respirable silica particles are known to afflict workers in the vicinity of the saw with silicosis of the lung.

Known adaptations of concrete saws for simultaneous cutting and vacuum collection of concrete dust commonly incorporate electric powered, gasoline powered, or propane powered vacuuming apparatus. Such vacuum equipped concrete saws typically require the employment of a second worker to operate and maneuver the vacuum, undesirably increasing labor costs incurred during concrete cutting operations.

The instant inventive concrete saw advantageously allows a single worker to perform vacuum assisted walk behind concrete saw cutting of a slab by incorporating as a component of the saw a second hand truck component attached in train with respect to the first hand truck component. The inventive adaptation incorporating such second hand truck component advantageously allows a single worker to simultaneously perform concrete cutting and concrete dust vacuuming, and to benefit from other functional advantages facilitated by the second hand truck.

BRIEF SUMMARY OF THE INVENTION

The instant inventive saw is intended to be used for cutting concrete slab fracture line guiding slots within concrete slab surfaces. Concrete slabs typically crack following initial fabrication due to motions of the slab and the underlying earth resulting from temperature and moisture level induced expansion and contraction cycles. Slots cut in a grid pattern within the slab shortly after fabrication desirably cause such cracking to coincide with the grid pattern.

First structural components of the instant inventive saw comprise front and rear hand trucks. In a preferred embodiment, each of the saw's hand truck components has a lower foot plate or base, and has an upwardly extending handle. A lower end of each hand truck's handle is preferably fixedly attached to a proximal end of said each hand truck's foot plate or base component.

Further structural components of the instant inventive concrete saw comprise front and rear pluralities of wheels. The wheel pluralities are preferably respectively fixedly attached to and respectively extend downwardly from the bases of the front and rear hand trucks. Distally positioned wheels attached to the base of the rear hand truck are preferably caster wheels which swivel about a vertical axis in order to prevent such wheels from resisting turning of the saw during use.

A further structural component of the instant inventive saw comprises a motor and rotary cutting blade or cutting wheel combination. In a preferred embodiment, such combination is fixedly attached to and is supported upon the front hand truck's base component. In such embodiment, the combination's motor component is a gas powered internal combustion engine, and the cutting wheel is positioned and rotatably driven at a lateral position with respect to the motor and the base.

A further structural component of the instant inventive concrete saw comprises a motor powered vacuum which is fixedly attached to and is supported upon the rear hand truck component via attachment to the rear hand truck's handle, or via attachment to the rear hand truck's base. In the preferred embodiment, the motor powered vacuum is cordless, incorporating an on-board rechargeable battery which powers an electric motor, such motor driving a centrifugal vacuum drawing air impeller. Such motor and air impeller combination is preferably mounted to the top of a vacuum cyclonic canister whose lower dust output opening communicates with a concrete dust cuttings collection bag.

In the preferred embodiment, the motor, impeller, and cyclonic canister assembly are securely mounted to the rear hand truck's handle (as opposed to a suitably alternate mounting to the rear hand truck's base), while the rear hand truck's base supports concrete dust and cuttings contained within a flexible concrete cuttings collection bag.

A further structural component of the instant inventive concrete saw comprises a vacuum housing which enshrouds an upper end of the cutting wheel. The vacuum housing is mounted to the front hand truck's base or other suitable mounting point. Such housing defines, in combination with the upper surface of the concrete slab, a substantially enclosed space within which vacuum extraction of concrete dust will occur.

A further structural component of the instant inventive concrete saw comprises a vacuum tube which spans between and operatively interconnects the preferably provided cyclonic canister and vacuum housing. Operation of the motor powered vacuum induces negative vacuum pressure within the vacuum tube, evacuating air and dust cuttings from the interior of the vacuum housing. In a preferred embodiment, the input end of the vacuum tube is located at a forward and upper end of the vacuum housing. Such preferred positioning of the vacuum tube's input end derives a functional advantage with respect to the common rotation of the cutting wheel or blade wherein the forward flights of the blade's cutting teeth move upwardly toward the forward and upper end of the housing's interior. Dust and cuttings are advantageously thrown by such cutting teeth toward the overlying tube input end.

A further structural component of the instant inventive concrete saw comprises a trailering latch which interconnects the front and rear hand trucks. In the preferred embodiment, the trailering latch component is releasable, and is easily and conveniently attachable and detachable. Engagement of the trailering latch component advantageously positions the rear hand truck rearwardly from the front hand truck so that frontward propulsion applied to the front hand truck's handle simultaneously forwardly drives the forward hand truck and its attached motor, vacuum housing, and cutting wheel, while simultaneously forwardly pulling in a trailering fashion, the rearward hand truck including its attached and supported vacuuming components. The instant inventive saw advantageously allows a single operator to simultaneously perform vacuum assisted concrete cutting. Upon disconnection of the rear hand truck, the operator may utilize the separated rear hand truck for convenient transport and offloading of bagged concrete cuttings.

Accordingly, objects of the instant invention include the provision of a concrete saw for cutting control joints, slots, or grooves within concrete slab surfaces which incorporates structures, as described above, and which arranges those structures in relation to each other in manners described above for the achievement and performance of beneficial functions, as described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
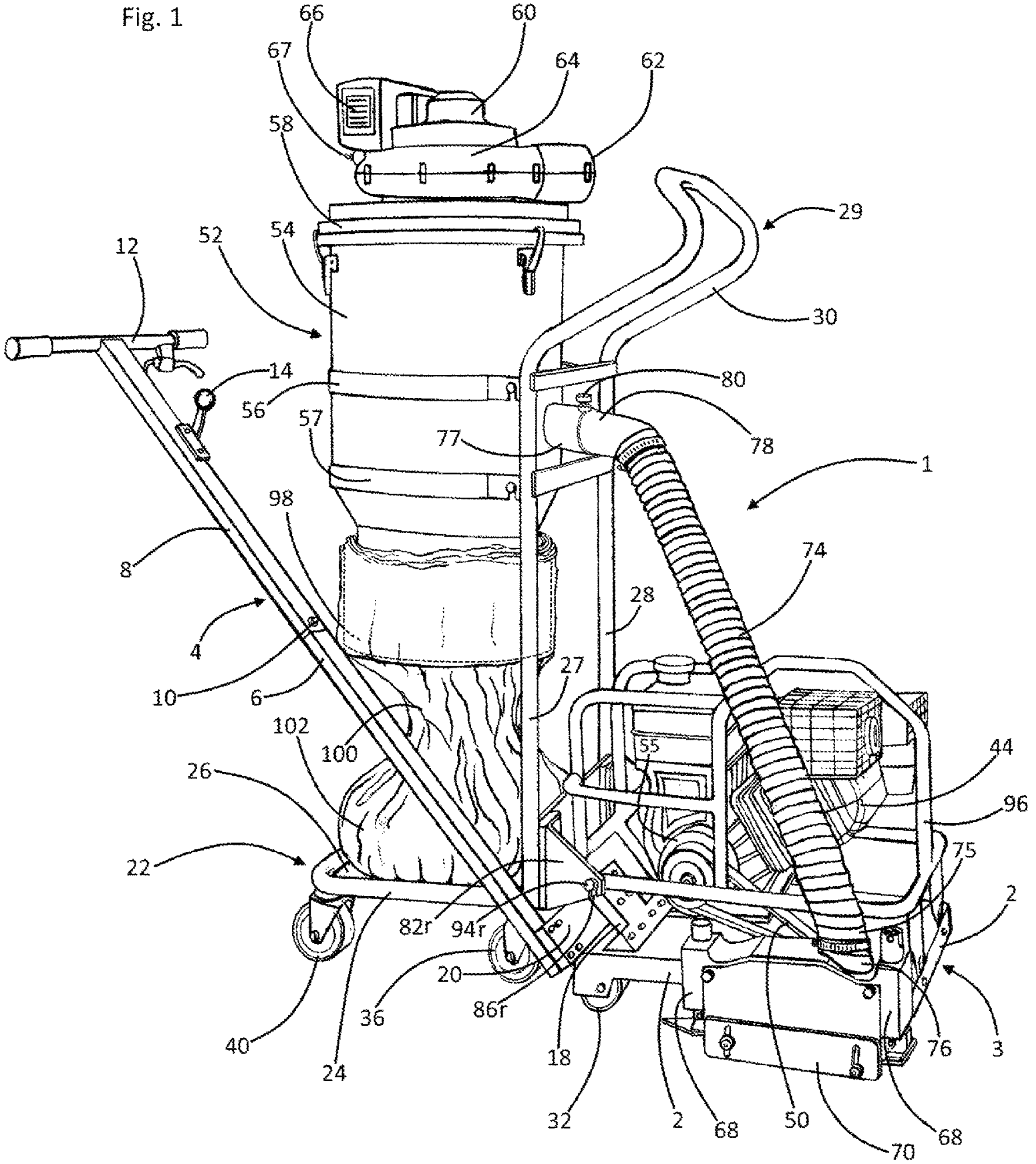
FIG. 1 is a perspective view of the instant inventive concrete saw for cutting relief slots in concrete slab surfaces.
Figure 4:
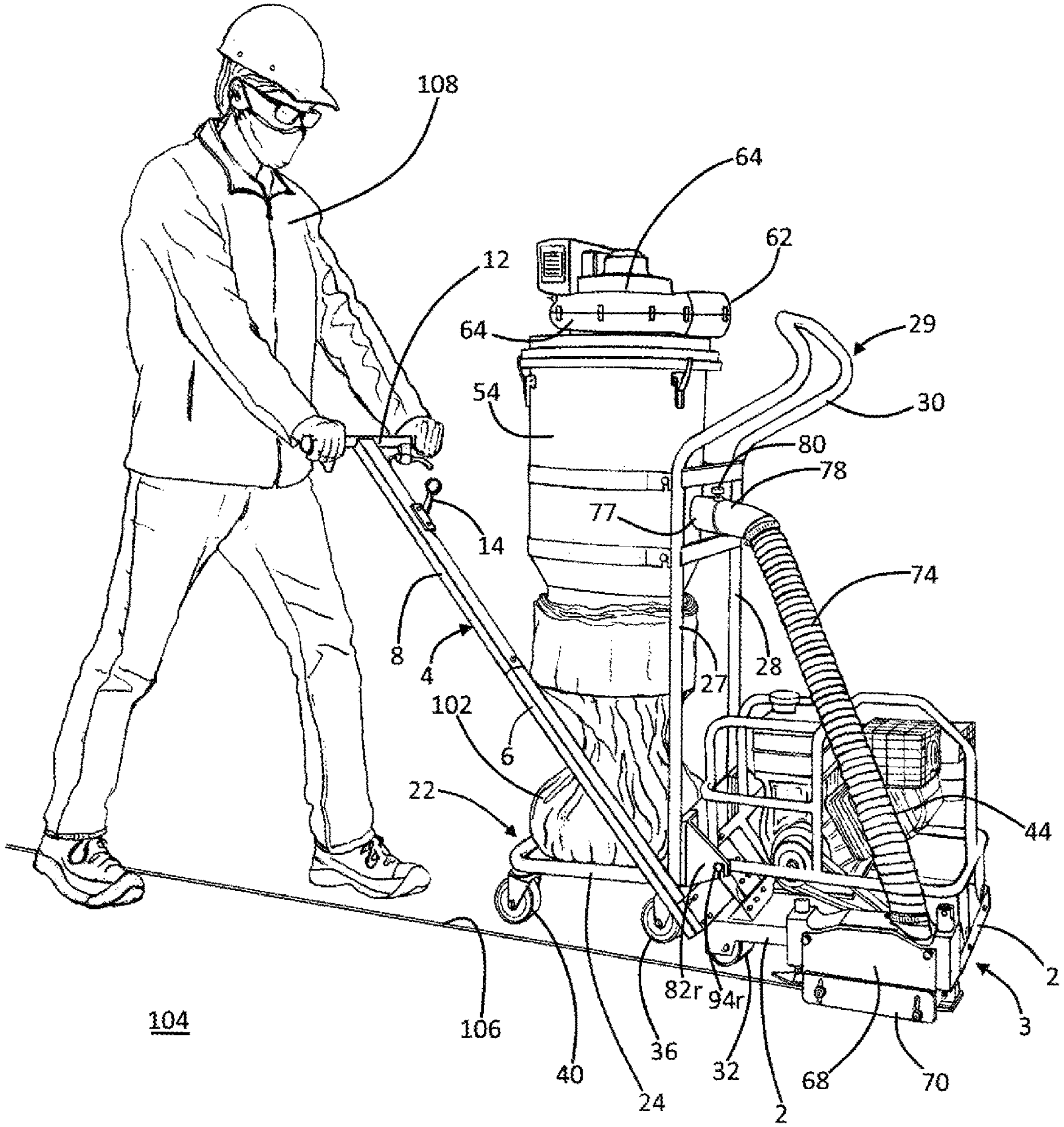
FIG. 4 redepicts the concrete saw of FIG. 1, the view of FIG. 4 further showing a worker operating the concrete saw.

Referring now to the drawings and in particular to Drawing FIGS. 1 and 4, the instant inventive concrete saw is referred to generally by Reference Arrow 1, such saw being intended for use for cutting slots, grooves, or control joints within a concrete slab as exemplified by slot 106 within slab surface 104.

The instant inventive saw 1 comprises a front hand truck component which is referred to generally by Reference Arrow 3, and a rear hand truck component which is referred to generally by Reference Arrow 22. The front and rear hand truck components 3 and 22 respectively include lower feet or bases 2 and 24, and have attached upwardly extending handles 4 and 29.

The handle component 4 of the front hand truck 3 is preferably fixedly attached to a proximal end of such hand truck's base 2. Similarly, the handle component 29 of the rearward hand truck 22 is fixedly attached to a proximal end of such hand truck's base 24. Handle 4 preferably comprises lower and upper segments 6 and 8 which are interconnected by a releasable joint 10, the handle having an upper "T" bar 12 for two handed forward propulsion of the saw. The handle component 29 of the rear hand truck 22 is suitably configured as an inverted "U", such handle having right and left uprights 27 and 28, and having an upper hand grip loop 30 which interconnects upper ends of such uprights.

Figure 2:
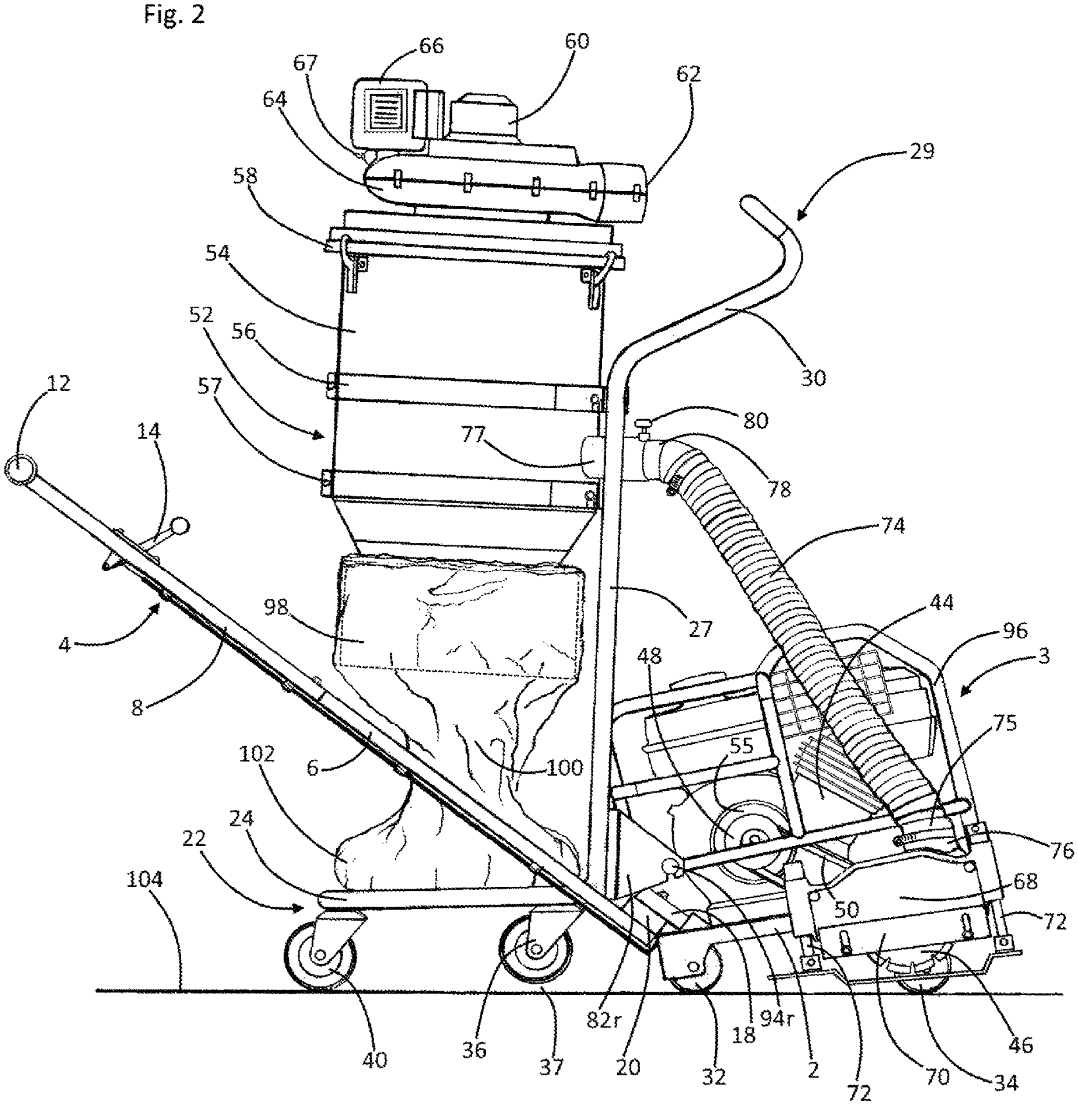
FIG. 2 is a side view of the concrete saw of FIG. 1.
Figure 5:
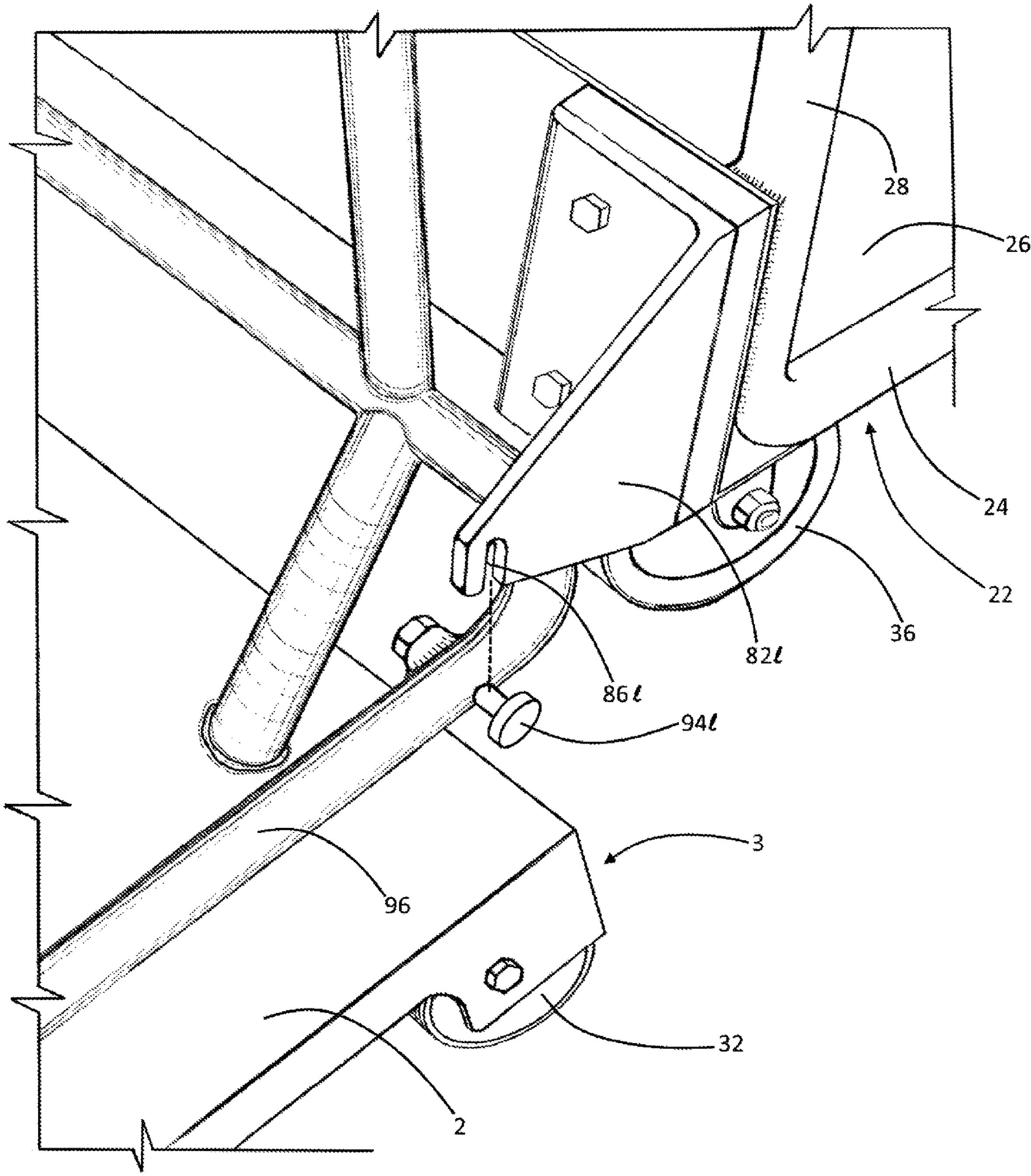
FIG. 5 is an alternative and partial perspective view of components of the FIG. 1 concrete saw.

Referring to FIGS. 1, 2, and 5, a front plurality of wheels 32 and 34 is fixedly and rotatably mounted to base 2, such wheels extending downwardly therefrom. In a preferred embodiment, laterally paired wheels 32 are fixedly and rotatably mounted to the under surface of the proximal end of the base 2. A rear plurality of wheels 36 and 40 is similarly fixedly and rotatably attached to the rear hand truck's base 24, such wheels similarly extending downwardly. Wheels 40 are preferably caster wheels which are fixedly attached to the distal end of base 24. While laterally paired distal caster wheels 40 are preferred, a single centrally positioned caster wheel (not depicted within views) may be suitably alternatively utilized. Proximal wheels 36 may be fixed wheels or caster wheels.

A motor and rotatable cutting wheel or blade combination incorporating, referring to FIG. 2, a motor 44 and a blade or cutting wheel 46 is preferably fixedly mounted to and supported upon the front hand truck's base 2. Suitably, the motor component of such combination may comprise an electric motor. However, such motor component preferably comprises a gas powered internal combustion engine. In the preferred motor and cutting wheel combination, a throttle control lever 14 is in fluid communication with the engine 44 to allow an operator to conveniently adjust motor rotation speed. The rotary output of the engine 44 turns a centrifugal clutch 55 which, upon frictional engagement, turns a drive pulley 48. Such pulley 48 cyclically drives belt 50 which rotates a driven pulley (not shown in views). The cutting wheel or blade 46 co-rotates with such driven pulley, the cutting wheel 46 being supported for rotation within a vacuum housing 68. In a preferred embodiment, the vacuum housing 68 enshrouds the upper end of the cutting wheel 46, such wheel having its cutting depth controlled by vertical slide shafts 72. Left and right slide plates 70 mounted to the left and right walls of the housing 68 allow the lower edges of said walls to effective abut the slab surface for a variable range of cutting depths.

In the preferred embodiment, the cutting wheel enshrouding vacuum housing 68 has a vacuum port 76 which communicates with the interior of the housing 68. As indicated above, said port preferably resides at an upper and forward position in order to open the housing at a point which coincides with the direction dust and cuttings are thrown by the blade 46. Referring to FIG. 4, as teeth at the front aspect of the blade 46 upwardly emerge from slot 106 during cutting of the slot, such teeth tend to throw concrete dust and cuttings directly upwardly within the housing 68. Placement of vacuum port 76 at such forward and overlying position to coincide with the direction of travel of such cuttings improves vacuuming efficiency of the assembly.

A further structural component of the instant inventive concrete saw comprises a motor powered vacuum which is referred to generally by Reference Arrow 52. As depicted in FIG. 1, the motor powered vacuum 52 is fixedly attached to and is supported by the handle component 29 of the rear hand truck 22, such attachment being effected by upper and lower canister encircling attachment brackets or bands 56 and 57. Suitably, the motor powered vacuum 52 may be alternatively supported by attachment brackets (not depicted in views) which extend upwardly from the hand truck's base 24.

Figure 3:
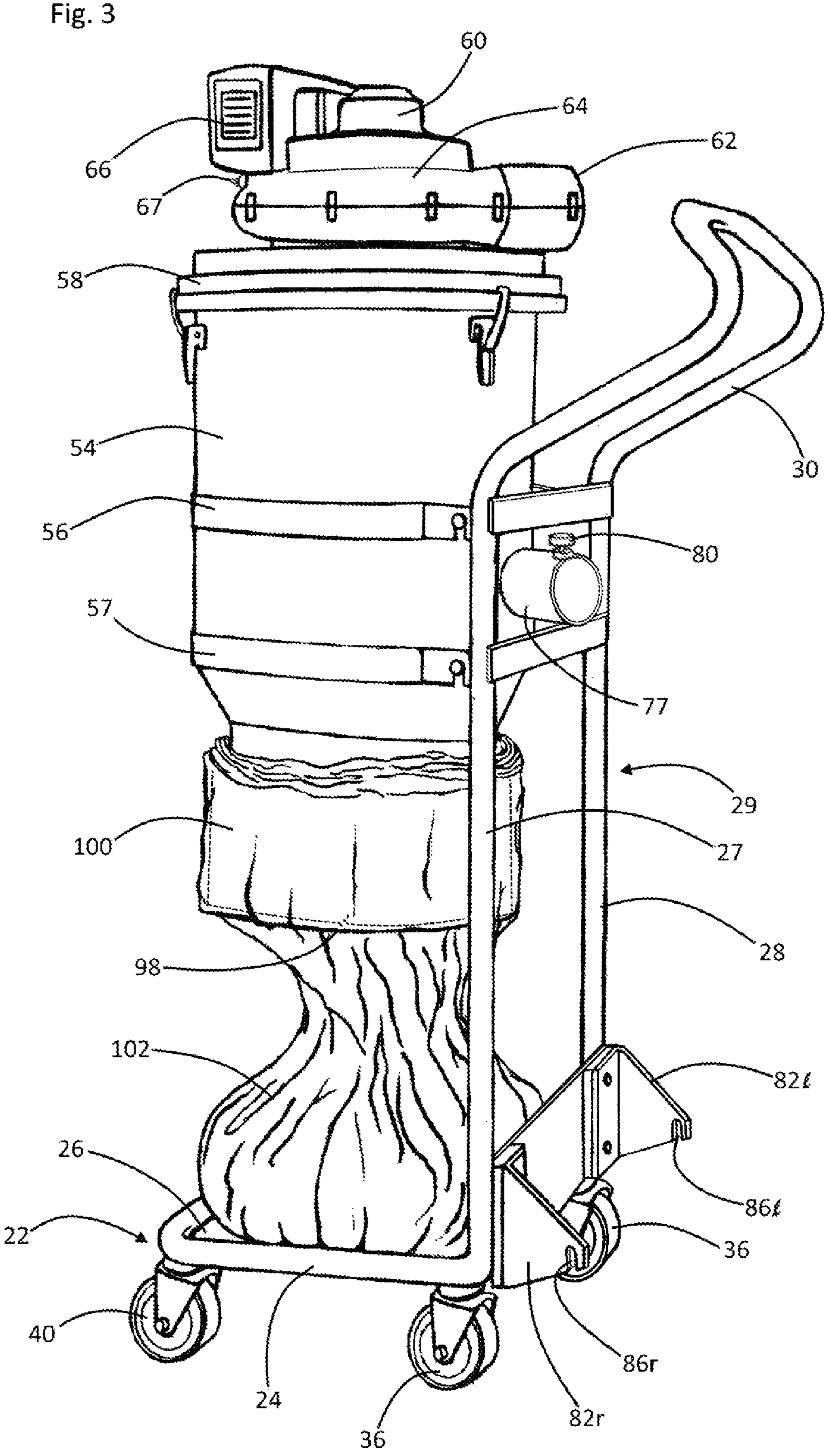
FIG. 3 presents an alternative perspective view of the concrete saw of FIG. 1, the view of FIG. 3 showing rearward vacuum components with forward saw components unlatched and removed.

In a preferred embodiment, the motor powered vacuum 52 comprises an electric motor 60 which drives a centrifugal impeller which rotates within an impeller housing 64. An onboard rechargeable battery 66 is preferably provided for electrically powering the motor 60, and an on/off switch 67 is provided. High air pressure exhaust driven by the motor 60 out of exhaust port 62 induces low vacuum pressure within an underlying cyclonic canister 54, such canister being opened by a vacuum port 77. As indicated in FIGS. 1 and 3, the vacuum port 77 is preferably configured as a tubular sleeve which attaches to and communicates with the cylindrical wall of the cyclonic canister 54. In the preferred embodiment such sleeve port 77 is preferably canted at an angle with respect to such canister wall so dust particles entering the canister are immediately moved in a circumferential direction within the canister. The upper and forward positioning of the vacuum housing's port 76 and the circumferential canting of port 77 work together to improve and enhance vacuuming efficiency. The motor, the impeller housing 64, and the battery 66 are preferably supported upon a canister lid 58 which is releasably latched to and covers the upper opening of the cyclonic canister 54.

A vacuum tube 74 has a suction end 75 which is fixedly mounted in communication with the vacuum port 76 of the vacuum housing 68. A vacuum dispensing end 78 of such hose 74 attaches to the cyclonic canister's vacuum port 77 by means of a releasable latch 80.

The cyclonic canister 54 preferably incorporates an internal dust filter (not depicted within views) which assures dust free exhaust at port 62, and a downwardly opening lower end 98 of the cyclonic canister 54 communicates with an upper opening of a flexible dust collection bag 100. A body of concrete dust 102 contained within the dust collection bag 100 may advantageously rest upon and be supported by a load bearing surface 26 of the base component 24 of the rear hand truck 22.

A trailering latch is preferably provided for interconnecting, and preferably releasably interconnecting the front and rear hand trucks 3 and 22. The invention's trailering latch component preferably arranges the front and rear hand trucks so that forward propulsion of the front hand truck 3 simultaneously forwardly pulls the rear hand truck 22. As indicated in FIG. 4, forward propulsion applied by the hands of an operator 108 to the "T" bar 12 of the front hand truck's handle 4 forwardly drives the front hand truck 3 and all of its attached components. Such forward propulsion, by virtue of the trailering latch, forwardly pulls the rear hand truck 22, along with its attached components.

Figure 6:
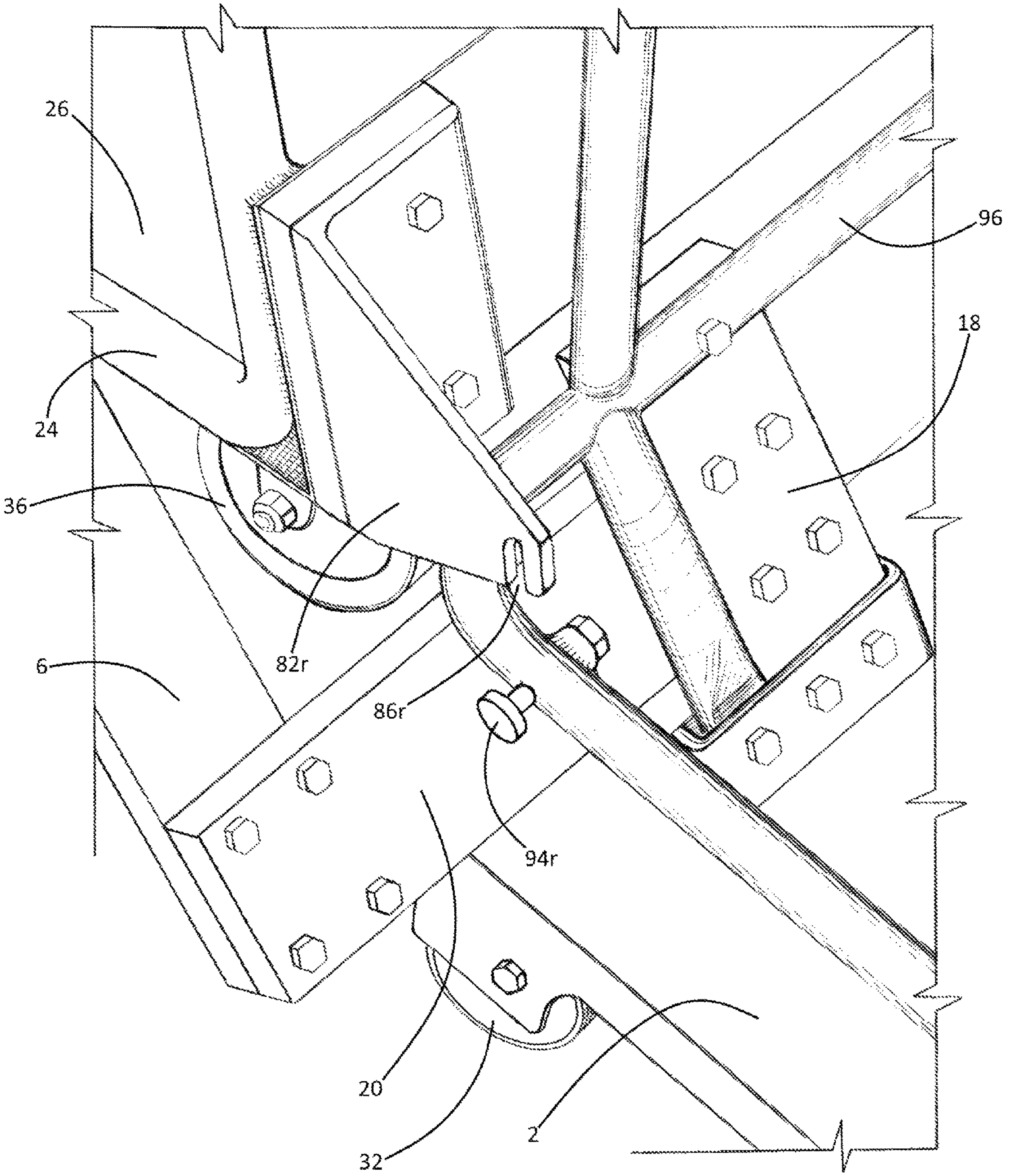
FIG. 6 is a further alternative partial perspective view of components of the FIG. 1 concrete saw.

In a preferred embodiment of the instant invention's trailering latch component, right and left attachment brackets **82*r* and 82*l* are fixedly attached to and forwardly extend from the proximal end of the rear hand truck's base 24. Forward ends of such brackets 82*r* and 82*l* suitably present downwardly opening "U" slots 86*r* and 86*l*, such slots respectively releasably engaging rightwardly and leftwardly extending pins 94*r* and 94*l* as depicted in FIGS. 5 and 6. In such embodiment, the gas powered motor 44 is encased within and protected by a tubular metal frame 96, such frame providing advantageous right and left anchoring points for mounting support of the right and left pins 94*r* and 94*l*. The depicted trailering latch 82*r*,86*r*,94*r*,82*l*,94*l*,86*l* is intended as being representative of other commonly known releasable latching fasteners (eg. hook and eye fasteners, "T" slot and "T" bar fasteners, screw attached fasteners, etc. Not depicted within views) which may suitably be alternatively utilized for releasably interconnecting structures such as the front and rear hand trucks 3 and 22**.

As indicated in FIG. 4, the trailering facilitating releasable latch components are preferably vertically upwardly positioned upon the protective frame 96 at an elevation which raises the proximal wheels 36 of the rear hand truck's base 24 slightly above the slab surface 104, such wheel elevation advantageously producing, as indicated in FIG. 2, a clearance gap 37. Upon raising the proximal wheels 36 above the slab surface 104, the preferred caster wheel character of the rear hand truck's distal wheels 40 advantageously rollably supports the distal end of the rear hand truck 22 while avoiding any resistance to horizontal turning of the front hand truck 3.

The vacuum housing 68 and its interior cutting wheel 46 are supported and operatively extended laterally from the base 2 of the front hand truck, such lateral positioning being depicted, for example, as a rightward cutting assembly extension. The instant inventive concrete saw 1 preferably correspondingly laterally, or, for example, rightwardly positions the handle 4 of the front hand truck component, such corresponding lateral positioning being accomplished by means of an oppositely laterally extending mounting plate 20 whose oppositely lateral end is fixedly attached to a base mount bracket 18. The lateral positioning of the handle 4 allows a forward propulsion force applied to "T" bar 12 to advantageously align with the cutting wheel 46. Such lateral positioning of the handle 4 requires that the rearward hand truck 22 including its attached components reside oppositely laterally from the handle 4.

Referring to FIGS. 2 and 4, in operation of the instant inventive saw 1, the operator 108 may grasp "T" bar 12. Such operator may manually control motor speed via lever 14. Upon motor driven rotary actuation of the cutting wheel 46, the operator may manually raise the "T" bar 12, causing the forward hand truck's base 2, vacuum housing 68, and cutting wheel 46 to pivot downwardly toward the upper slab surface 104. During such pivoting action, the trailering latch **82*r*,86*r*,94*r*, 82*l*,86*l*,94*l***, advantageously functions as a rotary pivot joint.

Upon contact of the cutting wheel or blade 46 with the upper slab surface 104, such wheel commences to cut a concrete slab relief slot 106. Simultaneous operation of the motor powered vacuum 52 evacuates air within the interior of the housing 68, drawing silica concrete dust and cuttings upwardly along the vacuum tube 74. Such cuttings enter the cyclonic canister 54 via vacuum port 77, and circulating air flow within the canister 54 directs the dust and cuttings downwardly toward the canister's lower opening 98. Cuttings and dust within the cyclonic canister fall downwardly into collection bag 100. With the trailing latches engaged, the rear hand truck 22 moves forwardly simultaneously with the cutting motion of the front hand truck 3.

Upon filling of bag 100 with concrete dust 102, the operator 108 may deactivate the vacuum 52 by manipulating on/off switch 67, and by setting the motor 44 to idle. Thereafter, the operator may easily and conveniently disengage the upper opening of the bag 100 from the lower opening 98 of the cyclonic canister 54. Thereafter the operator may close the bag 100 with a tie to contain the silica dust 102, and remove the bag to a disposal location.

Upon completion of slab cutting and slotting operations, the operator 108 may disconnect the may release latch 80 to disconnect the vacuum tube 74 from the cyclonic canister 54. Thereafter, the operator 108 may manually raise the proximal or handle end of the rear hand truck 22, disengaging the trailing releasable latch. Thereafter, the rear hand truck 22 may rest upon its wheels separate from the front hand truck. Thereafter, the operator may grasp the upper hand grip portion 30 of the rear hand truck's handle 29, and may tilt the rear hand truck 22 rearwardly toward the operator in a manner similar to the operation of conventional hand trucks. Thereafter, the rear hand truck 22 and attached vacuum components may be rollably moved to storage or equipment transport location. Thereafter, the forward hand truck 3 along with its attached components may be similarly rollably moved. Reversals of the steps described above allow the inventive concrete saw to be reconfigured for recommencement of concrete slab cutting.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative, and that the invention be given a scope commensurate with the appended claims.

The invention hereby claimed is:

1. A concrete saw for cutting a relief slot in a concrete slab surface, said saw comprising:

(a) a front hand truck comprising a front hand truck base and an upwardly extending front hand truck handle, wherein the front hand truck handle comprises an upper end and a lower end, wherein the lower end is fixedly attached to the front hand truck base, wherein the front hand truck handle further comprises a pushing force transmitting segment between said handle's upper and lower ends;

(b) a rear hand truck having a rear hand truck base and an upwardly extending rear hand truck handle fixedly attached to the rear hand truck base;

(c) front and rear pluralities of wheels respectively fixedly attached to and extending downwardly from the front and rear hand truck bases;

(d) a motor and cutting wheel combination operatively supported upon the front hand truck base;

(e) a motor powered vacuum fixedly attached to a hand truck component selected from the rear hand truck handle and the rear hand truck base;

(f) a vacuum housing enshrouding an upper end of the cutting wheel;

(g) a vacuum tube operatively interconnecting the motor powered vacuum and the vacuum housing; and (h) a trailering latch releasably interconnecting the front and rear hand trucks so that forward propulsion of the front hand truck forwardly pulls the rearward hand truck.

2. The concrete saw of claim 1 wherein the trailering latch comprises right and left releasable latches.

3. The concrete saw of claim 2 wherein the rear hand truck base has a proximal end and a distal end, wherein the rear plurality of wheels comprises a proximal pair of wheels positioned at said proximal end, and wherein the rear plurality of wheels further comprises at least a first distal wheel positioned at said distal end.

4. The concrete saw of claim 3 wherein the right and left releasable latches are positioned for, upon latching, suspending the proximal pair of wheels above the concrete slab surface.

5. The concrete saw of claim 4 wherein the front hand truck base has a proximal end, and wherein lower ends of the front and rear hand truck handles are respectively positioned at the proximal ends of the front and rear hand truck bases.

6. The concrete saw of claim 5 wherein the left and right releasable latches comprise pin and "U" slot fasteners.

7. The concrete saw of claim 5 wherein the motor powered vacuum comprises a cyclonic canister, and wherein the hand truck component to which the motor powered vacuum is fixedly attached comprises the rear hand truck handle.

8. The concrete saw of claim 7 wherein the rear hand truck base has a load bearing surface underlying a lower end of the cyclonic canister, and further comprising a dust collection bag overlying said load bearing surface, the dust collection bag being connected operatively to the cyclonic canister.

9. The concrete saw of claim 7 wherein the vacuum tube has a canister attachment end and a vacuum housing attachment end, and further comprising a releasable latch attaching the canister attachment end of the vacuum tube to the cyclonic canister.

10. The concrete saw of claim 7 wherein the vacuum housing has a vacuum port overlying a forward and upper end of the cutting wheel, and wherein a suction end of the vacuum communicates with said vacuum port.

11. The concrete saw of claim 7 wherein the motor powered vacuum comprises an electric motor mounted at an upper end of the cyclonic canister.

12. The concrete saw of claim 11 further comprising a rechargeable battery mounted upon the cyclonic canister.

13. The concrete saw of claim 5 wherein the rear hand truck's at least first distal wheel comprises a swivel caster wheel.

14. The concrete saw of claim 13 further comprising a second swivel caster wheel fixedly attached to the rear hand truck base, said wheel being positioned laterally from the at least first swivel caster wheel.

15. The concrete saw of claim 5 wherein the motor and cutting wheel combination's cutting wheel is positioned laterally from the front hand truck base, and wherein, upon latching of the left and right releasable latches, the rear hand truck is positioned oppositely laterally from the front hand truck handle.

* * * * *